US009722918B2

(12) United States Patent
Oshiba

(10) Patent No.: US 9,722,918 B2
(45) Date of Patent: Aug. 1, 2017

(54) SYSTEM AND METHOD FOR CUSTOMIZING THE IDENTIFICATION OF APPLICATION OR CONTENT TYPE

(71) Applicant: A10 Networks, Inc., San Jose, CA (US)

(72) Inventor: Dennis Isao Oshiba, Fremont, CA (US)

(73) Assignee: A10 NETWORKS, INC., San Jose, CA (US)

( * ) Notice: Subject to any disclaimer, the term of this patent is extended or adjusted under 35 U.S.C. 154(b) by 621 days.

(21) Appl. No.: 13/842,372

(22) Filed: Mar. 15, 2013

(65) Prior Publication Data
US 2014/0269308 A1  Sep. 18, 2014

(51) Int. Cl.
G06F 15/16    (2006.01)
H04L 12/725   (2013.01)
H04L 12/813   (2013.01)
H04L 12/851   (2013.01)
H04L 12/26    (2006.01)

(52) U.S. Cl.
CPC ............ H04L 45/30 (2013.01); H04L 43/028 (2013.01); H04L 47/20 (2013.01); H04L 47/2408 (2013.01); H04L 47/2441 (2013.01)

(58) Field of Classification Search
CPC ..... G06F 15/16; G06F 17/3089; H04L 1/1887
USPC ....................................................... 709/227
See application file for complete search history.

(56) References Cited

U.S. PATENT DOCUMENTS

| 4,001,819 A | 1/1977 | Wise |
| 4,780,905 A | 10/1988 | Cruts et al. |
| 5,101,402 A | 3/1992 | Chiu et al. |
| 5,163,088 A | 11/1992 | LoCascio |

(Continued)

FOREIGN PATENT DOCUMENTS

| CN | 1422468 A | 6/2003 |
| CN | 104106241 A | 10/2014 |

(Continued)

OTHER PUBLICATIONS

Mutz, "Linux Encryption How To," available at http://encryptionhowto.sourceforge.net/Encryption-HOWTO-1.html, Oct. 4, 2000.

(Continued)

Primary Examiner — Aftab N. Khan

(57) ABSTRACT

Expertise, for performing classification of a type of network traffic, can be encapsulated in a module. A set of modules, as currently available to a traffic controller, can be referred to as a collection. Programming language constructs are introduced that facilitate the writing of modules customized to identify network traffic that is peculiar to a particular user, or to a relatively small group of users. An example programming language, based on Tcl, is introduced. A key aspect is event-driven programming, and the "when" command construct is introduced. Three important event types, that can trigger a "when" command, are CLIENT_DATA, SERVER_DATA, and RULE_INIT. Another key aspect is an ability to keep state information between events. Constructs for intra-session, intra-module, and global state are introduced. A module can be blocked from executing more than once for a session. Successful execution of a module can be specified by a "match" statement.

20 Claims, 20 Drawing Sheets

(56) References Cited

U.S. PATENT DOCUMENTS

| | | |
|---|---|---|
| 5,359,659 A | 10/1994 | Rosenthal |
| 5,414,833 A | 5/1995 | Hershey et al. |
| 5,584,023 A | 12/1996 | Hsu |
| 5,684,875 A | 11/1997 | Ellenberger |
| 5,757,908 A | 5/1998 | Cooper et al. |
| 5,940,002 A | 8/1999 | Finn et al. |
| 5,960,177 A | 9/1999 | Tanno |
| 6,088,804 A | 7/2000 | Hill et al. |
| 6,119,236 A | 9/2000 | Shipley |
| 6,185,681 B1 | 2/2001 | Zizzi |
| 6,205,115 B1 | 3/2001 | Ikebe et al. |
| 6,237,036 B1 | 5/2001 | Ueno et al. |
| 6,249,866 B1 | 6/2001 | Brundrett et al. |
| 6,259,789 B1 | 7/2001 | Paone |
| 6,304,975 B1 | 10/2001 | Shipley |
| 6,324,286 B1 | 11/2001 | Lai et al. |
| 6,347,376 B1 | 2/2002 | Attwood et al. |
| 6,363,486 B1 | 3/2002 | Knapton, III |
| 6,449,651 B1 | 9/2002 | Dorfman et al. |
| 6,505,192 B1 | 1/2003 | Godwin et al. |
| 6,519,703 B1 | 2/2003 | Joyce |
| 6,594,780 B1 | 7/2003 | Shen et al. |
| 6,715,081 B1 | 3/2004 | Attwood et al. |
| 6,732,279 B2 | 5/2004 | Hoffman |
| 6,735,702 B1 | 5/2004 | Yavatkar et al. |
| 6,754,832 B1 | 6/2004 | Godwin et al. |
| 6,757,822 B1 | 6/2004 | Feiertag et al. |
| 6,779,117 B1 | 8/2004 | Wells |
| 6,988,106 B2 | 1/2006 | Enderwick et al. |
| 7,092,357 B1 | 8/2006 | Ye |
| 7,159,237 B2 | 1/2007 | Schneier et al. |
| 7,194,766 B2 | 3/2007 | Noehring et al. |
| 7,200,760 B2 | 4/2007 | Riebe et al. |
| 7,221,757 B2 | 5/2007 | Alao |
| 7,222,366 B2 | 5/2007 | Bruton, III et al. |
| 7,296,283 B2 | 11/2007 | Hrastar et al. |
| 7,392,241 B2 | 6/2008 | Lin et al. |
| 7,409,712 B1 | 8/2008 | Brooks et al. |
| 7,418,733 B2 | 8/2008 | Connary et al. |
| 7,543,052 B1 | 6/2009 | Cesa Klein |
| 7,565,549 B2 | 7/2009 | Satterlee et al. |
| 7,577,833 B2 | 8/2009 | Lai |
| 7,596,695 B2 | 9/2009 | Liao et al. |
| 7,620,733 B1 | 11/2009 | Tzakikario et al. |
| 7,640,591 B1 | 12/2009 | Tripathi et al. |
| 7,653,633 B2 | 1/2010 | Villella et al. |
| 7,665,138 B2 | 2/2010 | Song et al. |
| 7,739,494 B1 | 6/2010 | McCorkendale et al. |
| 7,739,736 B1 | 6/2010 | Tripathi et al. |
| 7,809,131 B1 | 10/2010 | Njemanze et al. |
| 7,895,649 B1 | 2/2011 | Brook et al. |
| 7,925,766 B2 | 4/2011 | Jayawardena et al. |
| 7,953,855 B2 | 5/2011 | Jayawardena et al. |
| 8,037,532 B2 | 10/2011 | Haswell |
| 8,089,871 B2 | 1/2012 | Iloglu et al. |
| 8,220,056 B2 | 7/2012 | Owens, Jr. |
| 8,239,670 B1 | 8/2012 | Kaufman et al. |
| 8,276,203 B2 | 9/2012 | Nakhre et al. |
| 8,286,227 B1 | 10/2012 | Zheng |
| 8,289,981 B1 | 10/2012 | Wei et al. |
| 8,301,802 B2 | 10/2012 | Wei et al. |
| 8,448,245 B2 | 5/2013 | Banerjee et al. |
| 8,478,708 B1 | 7/2013 | Larcom |
| 8,595,845 B2 | 11/2013 | Basavapatna et al. |
| 8,719,446 B2 | 5/2014 | Spatscheck et al. |
| 8,800,034 B2 | 8/2014 | McHugh et al. |
| 8,806,011 B1 | 8/2014 | Graham-Cumming |
| 8,813,228 B2 | 8/2014 | Magee et al. |
| 8,832,832 B1 | 9/2014 | Visbal |
| 8,881,284 B1 | 11/2014 | Gabriel |
| 8,948,380 B2 | 2/2015 | Goto |
| 9,129,116 B1 | 9/2015 | Wiltzius |
| 9,215,208 B2 | 12/2015 | Fraize et al. |
| 9,294,503 B2 | 3/2016 | Thompson et al. |
| 2001/0042204 A1 | 11/2001 | Blaker et al. |
| 2002/0087708 A1 | 7/2002 | Low et al. |
| 2002/0108059 A1 | 8/2002 | Canion et al. |
| 2002/0165912 A1 | 11/2002 | Wenocur et al. |
| 2002/0188839 A1 | 12/2002 | Noehring et al. |
| 2003/0023846 A1 | 1/2003 | Krishna et al. |
| 2003/0028585 A1 | 2/2003 | Yeager et al. |
| 2003/0061507 A1 | 3/2003 | Xiong et al. |
| 2003/0069973 A1 | 4/2003 | Ganesan et al. |
| 2003/0123667 A1 | 7/2003 | Weber et al. |
| 2003/0135625 A1 | 7/2003 | Fontes et al. |
| 2003/0187688 A1 | 10/2003 | Fey et al. |
| 2003/0196081 A1 | 10/2003 | Savarda et al. |
| 2003/0200456 A1 | 10/2003 | Cyr et al. |
| 2004/0008711 A1 | 1/2004 | Lahti et al. |
| 2004/0054807 A1 | 3/2004 | Harvey et al. |
| 2004/0057579 A1 | 3/2004 | Fahrny |
| 2004/0059943 A1 | 3/2004 | Marquet et al. |
| 2004/0059951 A1 | 3/2004 | Pinkas et al. |
| 2004/0059952 A1 | 3/2004 | Newport et al. |
| 2004/0091114 A1 | 5/2004 | Carter et al. |
| 2004/0093524 A1 | 5/2004 | Sakai |
| 2004/0111635 A1 | 6/2004 | Boivie et al. |
| 2004/0143751 A1 | 7/2004 | Peikari |
| 2004/0148520 A1 | 7/2004 | Talpade et al. |
| 2004/0172538 A1 | 9/2004 | Satoh et al. |
| 2004/0242200 A1 | 12/2004 | Maeoka et al. |
| 2005/0021999 A1 | 1/2005 | Touitou et al. |
| 2005/0036501 A1 | 2/2005 | Chung et al. |
| 2005/0041584 A1 | 2/2005 | Lau et al. |
| 2005/0044068 A1 | 2/2005 | Lin et al. |
| 2005/0044270 A1 | 2/2005 | Grove et al. |
| 2005/0044352 A1 | 2/2005 | Pazi et al. |
| 2005/0108434 A1 | 5/2005 | Witchey |
| 2005/0125684 A1 | 6/2005 | Schmidt |
| 2005/0180416 A1 | 8/2005 | Jayawardena et al. |
| 2005/0193199 A1 | 9/2005 | Asokan et al. |
| 2005/0198099 A1 | 9/2005 | Motsinger et al. |
| 2005/0210243 A1 | 9/2005 | Archard et al. |
| 2005/0235145 A1 | 10/2005 | Slick et al. |
| 2005/0257093 A1 | 11/2005 | Johnson et al. |
| 2005/0278527 A1 | 12/2005 | Liao et al. |
| 2006/0056297 A1* | 3/2006 | Bryson .............. H04L 63/104 |
| | | 370/230 |
| 2006/0061507 A1 | 3/2006 | Mohamadi |
| 2006/0143707 A1 | 6/2006 | Song et al. |
| 2006/0185014 A1 | 8/2006 | Spatscheck et al. |
| 2006/0206936 A1 | 9/2006 | Liang et al. |
| 2006/0212522 A1 | 9/2006 | Walter et al. |
| 2006/0230444 A1 | 10/2006 | Iloglu et al. |
| 2006/0251057 A1 | 11/2006 | Kwon et al. |
| 2006/0253902 A1 | 11/2006 | Rabadan et al. |
| 2006/0256716 A1 | 11/2006 | Caci |
| 2006/0265585 A1 | 11/2006 | Lai |
| 2006/0288411 A1 | 12/2006 | Garg et al. |
| 2007/0056038 A1 | 3/2007 | Lok |
| 2007/0073660 A1 | 3/2007 | Quinlan |
| 2007/0143769 A1 | 6/2007 | Bu et al. |
| 2007/0169194 A1 | 7/2007 | Church et al. |
| 2007/0186282 A1 | 8/2007 | Jenkins |
| 2007/0214088 A1 | 9/2007 | Graham et al. |
| 2007/0280114 A1 | 12/2007 | Chao et al. |
| 2007/0291773 A1 | 12/2007 | Khan et al. |
| 2008/0183885 A1* | 7/2008 | Durrey .............. H04L 1/1887 |
| | | 709/231 |
| 2008/0229418 A1 | 9/2008 | Chen et al. |
| 2008/0256623 A1 | 10/2008 | Worley et al. |
| 2009/0049198 A1 | 2/2009 | Blinn et al. |
| 2009/0070470 A1 | 3/2009 | Bauman et al. |
| 2009/0077663 A1 | 3/2009 | Sun et al. |
| 2009/0083537 A1 | 3/2009 | Larsen et al. |
| 2009/0150996 A1 | 6/2009 | Haswell |
| 2009/0168995 A1* | 7/2009 | Banga .............. G06F 17/3089 |
| | | 380/28 |
| 2009/0227228 A1 | 9/2009 | Hu et al. |
| 2009/0241190 A1 | 9/2009 | Todd et al. |
| 2009/0287941 A1 | 11/2009 | Shouno |
| 2010/0106833 A1 | 4/2010 | Banerjee et al. |
| 2010/0138921 A1 | 6/2010 | Na et al. |

(56) References Cited

U.S. PATENT DOCUMENTS

| | | | |
|---|---|---|---|
| 2010/0284300 A1* | 11/2010 | Deshpande | H04L 43/026 370/253 |
| 2010/0286998 A1 | 11/2010 | Picken | |
| 2011/0026537 A1 | 2/2011 | Kolhi et al. | |
| 2011/0029599 A1 | 2/2011 | Pulleyn et al. | |
| 2011/0082947 A1 | 4/2011 | Szeto et al. | |
| 2011/0093785 A1 | 4/2011 | Lee et al. | |
| 2011/0131646 A1 | 6/2011 | Park et al. | |
| 2011/0153744 A1 | 6/2011 | Brown | |
| 2011/0188452 A1 | 8/2011 | Borleske et al. | |
| 2011/0249572 A1 | 10/2011 | Singhal et al. | |
| 2011/0282997 A1 | 11/2011 | Prince et al. | |
| 2012/0036272 A1 | 2/2012 | El Zur | |
| 2012/0042060 A1 | 2/2012 | Jackowski et al. | |
| 2012/0096546 A1 | 4/2012 | Dilley et al. | |
| 2012/0110472 A1* | 5/2012 | Amrhein | G06F 17/30873 715/753 |
| 2012/0117646 A1 | 5/2012 | Yoon et al. | |
| 2012/0144461 A1 | 6/2012 | Rathbun | |
| 2012/0155274 A1 | 6/2012 | Wang et al. | |
| 2012/0163186 A1 | 6/2012 | Wei et al. | |
| 2012/0174196 A1 | 7/2012 | Bhogavilli et al. | |
| 2012/0226582 A1 | 9/2012 | Hammad | |
| 2012/0227109 A1 | 9/2012 | Dimuro | |
| 2012/0266242 A1 | 10/2012 | Yang et al. | |
| 2012/0307631 A1 | 12/2012 | Yang et al. | |
| 2013/0019025 A1 | 1/2013 | Chaturvedi et al. | |
| 2013/0124713 A1 | 5/2013 | Feinberg et al. | |
| 2013/0128885 A1 | 5/2013 | Kardashov et al. | |
| 2013/0139245 A1 | 5/2013 | Thomas | |
| 2013/0173795 A1 | 7/2013 | McPherson | |
| 2013/0198385 A1 | 8/2013 | Han et al. | |
| 2013/0198845 A1 | 8/2013 | Anvari | |
| 2013/0212265 A1 | 8/2013 | Rubio Vidales et al. | |
| 2013/0243194 A1 | 9/2013 | Hawkes et al. | |
| 2013/0263256 A1 | 10/2013 | Dickinson et al. | |
| 2014/0006508 A1 | 1/2014 | Goyet et al. | |
| 2014/0025568 A1 | 1/2014 | Smith et al. | |
| 2014/0137190 A1 | 5/2014 | Carey et al. | |
| 2014/0258489 A1 | 9/2014 | Muppala et al. | |
| 2014/0258536 A1 | 9/2014 | Chiong | |
| 2014/0280832 A1 | 9/2014 | Oshiba | |
| 2014/0283065 A1 | 9/2014 | Teddy et al. | |
| 2014/0298091 A1 | 10/2014 | Carlen et al. | |
| 2014/0310396 A1 | 10/2014 | Christodorescu et al. | |
| 2014/0325588 A1 | 10/2014 | Jalan et al. | |
| 2014/0344925 A1 | 11/2014 | Muthiah | |
| 2015/0033341 A1 | 1/2015 | Schmidtler et al. | |
| 2015/0058977 A1 | 2/2015 | Thompson et al. | |
| 2015/0088597 A1 | 3/2015 | Doherty et al. | |
| 2015/0143118 A1 | 5/2015 | Sheller et al. | |
| 2015/0312268 A1 | 10/2015 | Ray | |
| 2015/0333988 A1 | 11/2015 | Jalan et al. | |
| 2016/0036651 A1 | 2/2016 | Sureshchandra et al. | |
| 2016/0134655 A1 | 5/2016 | Thompson et al. | |

FOREIGN PATENT DOCUMENTS

| | | |
|---|---|---|
| HK | 1198848 A | 6/2015 |
| TW | 375721 | 12/1999 |
| TW | 477140 | 2/2002 |
| TW | 574655 | 2/2004 |
| TW | NI197237 | 2/2004 |
| TW | I225999 | 1/2005 |
| TW | I241818 | 10/2005 |
| TW | I252976 | 4/2006 |
| WO | 9842108 | 9/1998 |
| WO | WO2006039529 | 4/2006 |
| WO | WO2013112492 A1 | 8/2013 |
| WO | WO2014150617 | 9/2014 |
| WO | WO2014151072 | 9/2014 |
| WO | WO2014176461 | 10/2014 |
| WO | WO2015030977 | 3/2015 |

OTHER PUBLICATIONS

Ganesan et al., "YAPPERS: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerIS," IEEE, pp. 279-288, Dec. 12-14, 2002.

Obimo et al., "A parallel algorithm for determining the inverse of a matrix for use in blockcipher encryption/decryption," Journal of Supercomputing, vol. 39, No. 2, pp. 113-130, Feb. 2007.

Long et al., "ID-based threshold decryption secure against adaptive chosen-ciphertext attack," Computers and Electrical Engineering, vol. 33, No. 3, pp. 166-176, May 2007.

Popek, Gerald J., "Encryption and Secure Computer Networks," Computing Surveys, vol. 11, No. 4, pp. 1-26, Dec. 1979.

Oracle Corporation. Oracle Intelligent Agent User's Guide, Release 9.2.0, Part No. A96676-01. Mar. 2002.

SOL11243. iRules containing the RULE_INIT iRule event do not re-initialize when a syntax error is corrected. f5.support.com. May 24, 2010.

Dainotti, Albert et al. TIE: A Community-Oriented Traffic Classification Platform. May 11, 2009. Springer-Verlag, Traffic Monitoring and Analysis: Proceedings First International Workshop, TMA 2009. pp. 64-74. Retrieved from: Inspec. Accession No. 11061142.

Dainotti, Albert et al., "Early Classification of Network Traffic through Multi-Classification," Apr. 27, 2011, Springer Verlag, Traffic Monitoring and Analysis, Proceedings of the Third International Workshop, TMA 2011. pp. 122-135. Retrieved from INSPEC. Accession No. 12232145.

Liebergeld, Steffen et al., "Cellpot: A Concept for Next Generation Cellular Network Honeypots," Internet Society, Feb. 23, 2014, pp. 1-6.

Lee et al., "On the Detection of Signaling DoS Attacks on 3G Wireless Networks," IEEE Infocom 2007 processings, pp. 1289-1297.

"How to Create a Rule in Outlook 2003" CreateaRule—Outlook2003.doc 031405 mad, 3 pages.

Guo, Yuan-ni et al., "An Embedded Firewall System Design Based on Ptolemy II," Journal of System Simulation, vol. 16 No. 6, pp. 1361-1363, Jun. 2004.

Huang, Quan et al., "An Embedded Firewall Based on Network Processor," IEEE, 2nd International Conference on Embedded Software and Systems, 7 pages, Dec. 16-18, 2005.

Ihde, Michael et al., "Barbarians in the Gate: An Experimental Validation of NIC-Based Distributed Firewall Performance and Flood Tolerance," IEEE, International Conference on Dependable Systems and Networks, Jun. 25-28, 2006, 6 pages.

Susilo, W. et al., "Personal Firewall for Pocket PC 2003: Design & Implementation," IEEE 19th International Conference on Advanced Information Networking and Applications, vol. 2 pp. 661-666, Mar. 28-30, 2005.

\* cited by examiner

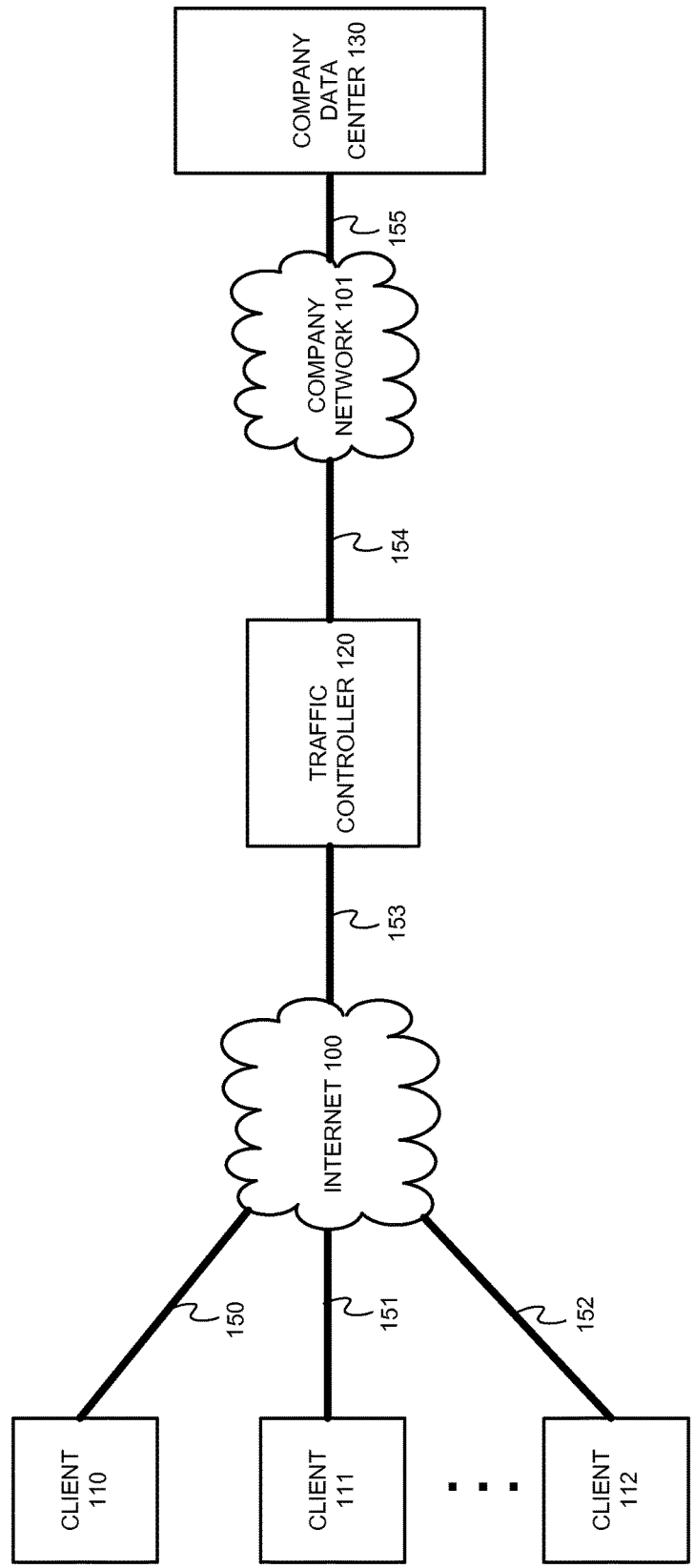

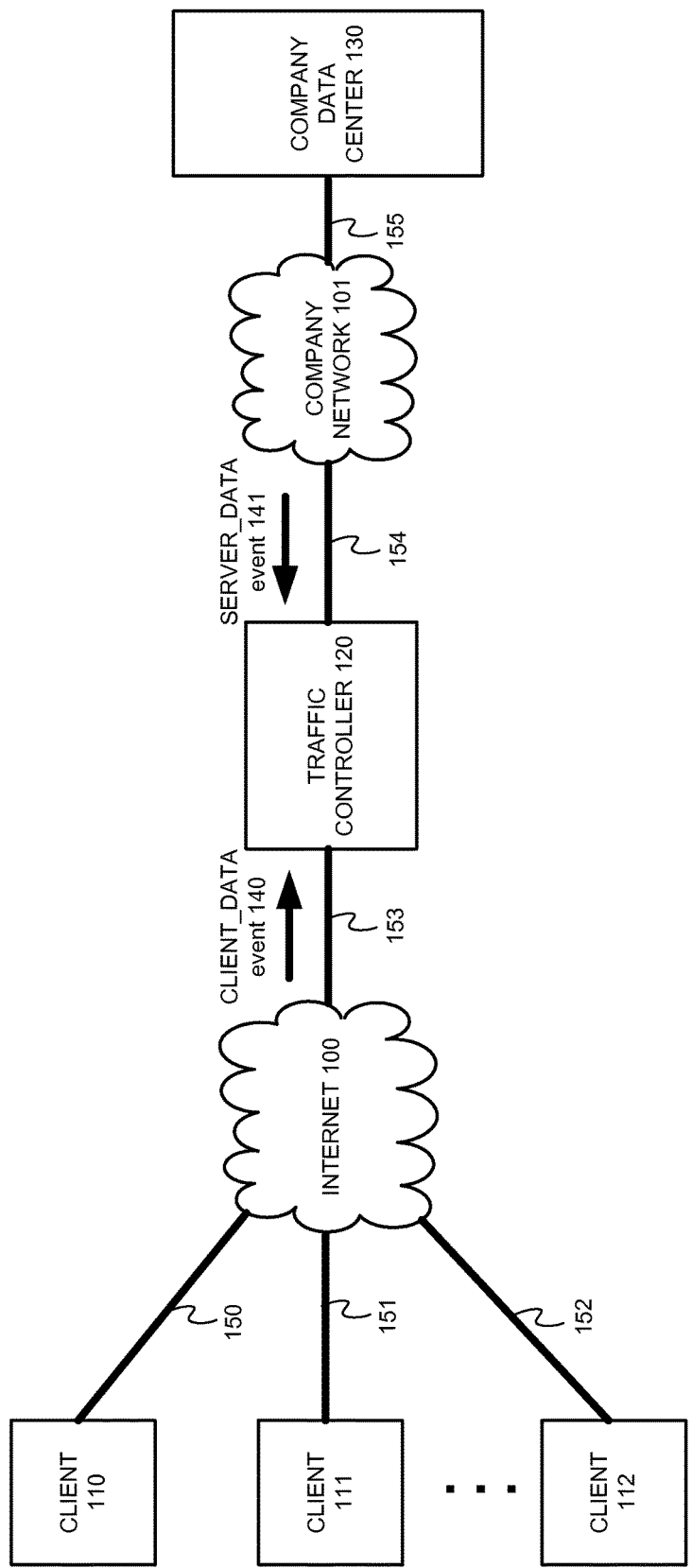

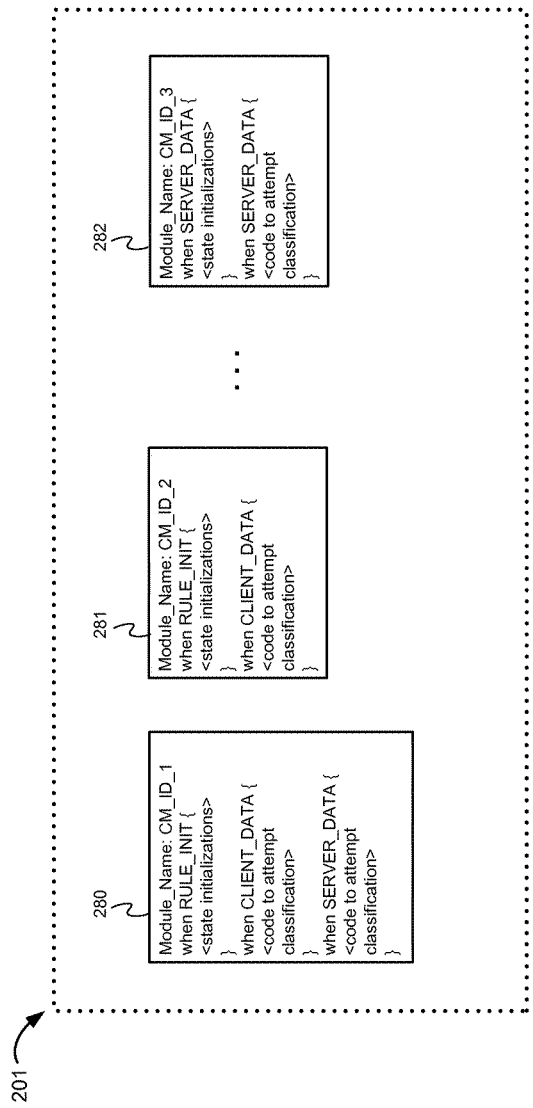

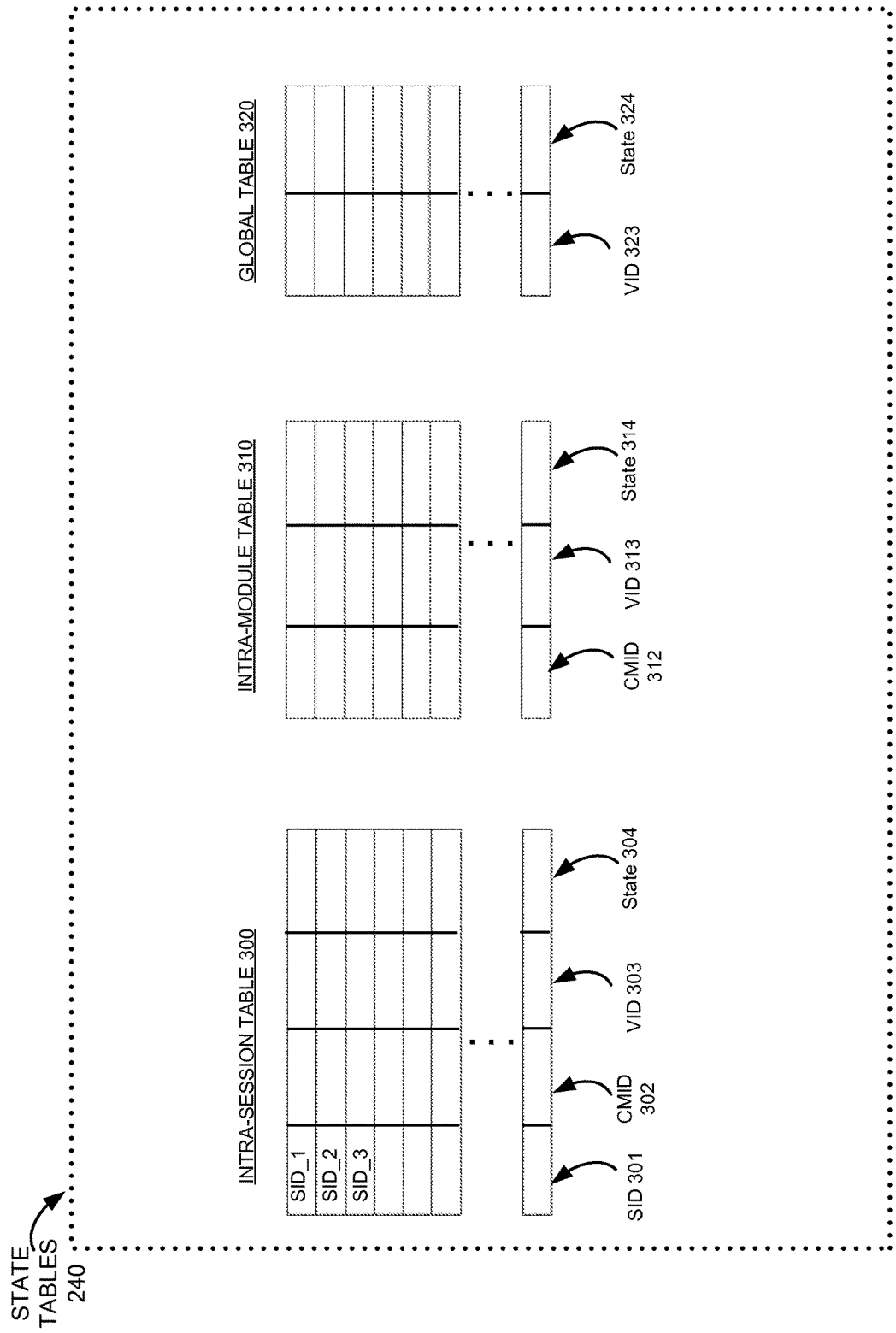

Figure 5A

```
1   when PACKET_RECEIVED {
2     # Upon occurrence of a PACKET_RECEIVED event, p_1 is assumed to represent the latest packet.
3     # As a result of the below call to session-detection, flag new_session is set as follows:
4     #     false: if, upon comparison of p_1 to entries of session_table, p_1 is determined to be a further continuation
5     #            of a pre-existing session. The variable s_1 is set to the pre-existing session of session_table.
6     #     true: if p_1 is determined to be the start of a new session. The variable s_1 is set to a newly-created session of session_table
7     # Regardless of whether new_session is set to true or false, s_over is set as follows:
8     #     true: if p_1 is last packet of session.
9     #     false: otherwise
10    new_session = session_detection (p_1, s_1, s_over)
11
12    If { new_session } {
13      For each classifier module cm_1 {
14        if { cm_1 has portion triggered by RULE_INIT event } {
15          For each declaration d_1 of intra-session persistent state {
16            make an item of state, state_1, accessible by a subsequent event e_2, so long as e_2
17            shares: s_1.SID, cm_1.CMID, and d_1.VID;
18          }
19          For each declaration d_1 of intra-module persistent state {
20            make an item of state, state_1, accessible by a subsequent event e_2, so long as e_2
21            shares: cm_1.CMID, and d_1.VID;
22          }
23          For each declaration d_1 of globally persistent state {
24            make an item of state, state_1, accessible by a subsequent event e_2, so long as e_2
25            shares: d_1.VID;
26          }
27        }
28      } # end, For each cm_1
29    } # end, if new_session
30
```

Figure 5B

```
1   # regardless of whether p_1 represents the start of a new session, and is therefore a RULE_INIT event,
2   # based on relationship of p_1 to the configured clients and servers, CLIENT_DATA_event and
3   # SERVER_DATA_ event are set as follows:
4   #    CLIENT_DATA_event = true, SERVER_DATA_ event = false: if p_1 is a CLIENT_DATA event
5   #    CLIENT_DATA_event = false, SERVER_DATA_ event = true: if p_1 is a SERVER_DATA event
6   event_detection (p_1, CLIENT_DATA_event, SERVER_DATA_event)
7
8   # the session ID, of session s_1, is referenced by s_1.session_ID
9   For each rule r_1 of rule_table {
10      if { r_1 uses a classifier module cm_1 } {
11          fetch any pre-existing state, under which to execute cm_1, using s_1.SID and cm_1.CMID;
12          if { CLIENT_DATA_event and cm_1 has "when CLIENT_DATA" [and state under s_1.SID and
13              cm_1.CMID allows execution] } {
14              # execution may include accessing of intra-session, intra-module, and/or global variables
15              execute CLIENT_DATA portion of cm_1;
16          }
17          if { SERVER_DATA_event and cm_1 has "when SERVER_DATA," [and state under s_1.SID and
18              cm_1.CMID allows execution] } {
19              # execution may include accessing of intra-session, intra-module, and/or global variables
20              execute SERVER_DATA portion of cm_1;
21          }
22          if { cm_1 returns success } {
23              execute action portion of r_1 that adds TID to s_1;
24              [ create state, under s_1.SID and cm_1.CMID, to block further execution of cm_1; ]
25          }
26      }
27      elseif { ≤ L4 criteria match } { execute action portion of r_1 that adds TID to s_1; }
28  } # end, For each rule r_1
29
30  packet_process (p_1, s_1);  # route and otherwise process p_1, in accordance with its Session Record
31
```

```
1  if { s_over } {
2      flush s_1 from session_table;
3      flush any state, locatable with s_1.SID, from state_table;
4  }
5  } # end, "when PACKET_RECEIVED"
```

```
1   # should be set as follows:
2   #    false: upon system initialization, when there is only one collection of classification modules
3   #    true: from just after a replacement collection of classification modules has been loaded, and until transition to replacement collection
4   #          has been completed
5   #    false: when all sessions that were active, when transitioning_flag was set to true, have either ended or been modified to refer to
6   #          the latest-loaded collection of classification modules
7   set ::global::transitioning_flag false
8
9   # When not transitioning between classification module collections, used to keep track of the number of sessions in session_table.
10  # As soon as a new cm collection is loaded, this count can only decrement, for one of the following reasons:
11  #    pre-existing session ends
12  #    pre-existing session can be modified to refer to the new cm collection
13  set ::global::num_old_sessions 0
14
15  # Only used while transitioning between classification module collections. Used to track:
16  #    number of new sessions created, and added to session_table, since loading of new cm collection
17  #    number of pre-existing sessions that have been modified to refer to the new cm collection
18  set ::global::num_new_sessions 0
19
20  # Used for toggling back and forth, between whether 0 or 1 is used to indicate each of the old or new collection
21  #    of classification modules
22  set ::global::old_collection 0
23  set ::global::new_collection 1
24
```

Figure 6B

```
1   # toggling procedure - uses an event called COLLECTION_LOADED
2   when COLLECTION_LOADED {
3
4       set transitioning_flag true;
5
6       For each session s_1 of Session Table {
7           if { no saved state under s_1.SID [or, for all saved state under s_1.SID and any CMID, execution blocked] } {
8               if { s_1.CID == old_collection } {
9                   flush any state, under s_1.SID, blocking execution;
10                  s_1.CID = new_collection;
11                  decrement num_old_sessions;
12                  increment num_new_sessions;
13                  if { num_old_sessions == 0 } {
14                      transitioning_flag = false;
15                      num_old_sessions = num_new_sessions;
16                      num_new_sessions = 0;
17                      swap_values(old_collection, new_collection)
18                  }
19              }
20          }
21      }
22
23  } # end, "when COLLECTION_LOADED"
```

Figure 6C

```
1   when PACKET_RECEIVED {
2     # Upon occurrence of a PACKET_RECEIVED event, p_1 is assumed to represent the latest packet.
3     # As a result of the below call to session-detection, flag new_session is set as follows:
4     #     false: if, upon comparison of p_1 to entries of session_table, p_1 is determined to be a further continuation
5     #            of a pre-existing session. The variable s_1 is set to the pre-existing session of session_table.
6     #     true: if p_1 is determined to be the start of a new session. The variable s_1 is set to a newly-created session of session_table
7     # Regardless of whether new_session is set to true or false, s_over is set as follows:
8     #     true: if p_1 is last packet of session.
9     #     false: otherwise
10    new_session = session_detection (p_1, s_1, s_over)
11
12    If { new_session } {
13      if { transitioning_flag } {
14        s_1.CID = new_collection;
15        increment num_new_sessions;
16        For each classifier module cm_1 of CM collection indicated by new_collection {
17          if { cm_1 has portion triggered by RULE_INIT event } {
18            For each declaration d_1 of intra-session persistent state {
19              make an item of state, accessible by a subsequent event e_2, so long as e_2
20                shares: s_1.SID, cm_1.CMID, and d_1.VID;
21            }
22          }
23        } # end, For each cm_1
24      }
```

Figure 6D

```
1   else {
2       s_1.CID = old_collection;
3       increment num_old_sessions;
4       For each classifier module cm_1 of CM collection indicated by old_collection {
5           if { cm_1 has portion triggered by RULE_INIT event } {
6               For each item of intra-session persistent state declared {
7                   make an item of state, named n_1, accessible by a subsequent event e_2, so
8                       long as e_2 shares: s_1.SID, cm_1.CMID, and n_1;
9               }
10          }
11      } # end, For each cm_1
12  } # end, else not transitioning
13 } # end, if new_session
14
15 # regardless of whether p_1 represents the start of a new session, and is therefore a RULE_INIT event,
16 # based on relationship of p_1 to the configured clients and servers, CLIENT_DATA_event and
17 # SERVER_DATA_event are set as follows:
18 #    CLIENT_DATA_event = true, SERVER_DATA_event = false: if p_1 is a CLIENT_DATA event
19 #    CLIENT_DATA_event = false, SERVER_DATA_event = true: if p_1 is a SERVER_DATA event
20
21 event_detection (p_1, CLIENT_DATA_event, SERVER_DATA_event)
22
```

Figure 6E

```
1   # the session ID, of session s_1, is referenced by s_1.SID
2   For each rule r_1 of rule_table {
3       if { r_1 uses a classifier module } {
4           if { transitioning_flag } {
5               if { s_1.CID == old_collection } { get cm_1, utilized by r_1, from CM collection indicated by
6                   old_collection }
7               else { get cm_1, utilized by r_1, from CM collection indicated by new_collection }
8           }
9           else { get cm_1, utilized by r_1, from CM collection indicated by old_collection }
10          fetch any pre-existing state, under which to execute cm_1, using s_1.SID and cm_1.CMID;
11          if { CLIENT_DATA_event and cm_1 has "when CLIENT_DATA" [and state under s_1.SID and
12              cm_1.CMID allows execution] } {
13              # execution may include accessing of intra-session variables
14              execute CLIENT_DATA portion of cm_1;
15          }
16          if { SERVER_DATA_event and cm_1 has "when SERVER_DATA" [and state under s_1.SID and
17              cm_1.CMID allows execution] } {
18              # execution may include accessing of intra-session variables
19              execute SERVER_DATA portion of cm_1;
20          }
21          if { cm_1 returns success } {
22              execute action portion of r_1 that adds TID to s_1;
23              [ create state, under s_1.SID and cm_1.CMID, to block further execution of cm_1; ]
24          }
25      }
26      elseif { ≤ L4 criteria match } { execute action portion of r_1 that adds TID to s_1; }
27  } # end, For each rule r_1
28
29  packet_process (p_1, s_1);   # route and otherwise process p_1, in accordance with its Session Record
```

Figure 6F

```
1   if { s_over } {
2       flush s_1 from session_table and any state under s_1.SID from state_table;
3       if { transitioning_flag } {
4           if { new_session } {
5               decrement num_new_sessions;
6           }
7           else {
8               if { s_1.CID == old_collection } {
9                   decrement num_old_sessions;
10                  if { num_old_sessions == 0 } {
11                      transitioning_flag = false;
12                      num_old_sessions = num_new_sessions;
13                      num_new_sessions = 0;
14                      swap_values(old_collection, new_collection)
15                  }
16              else { decrement num_new_sessions; }
17          }
18      } # end, if transitioning_flag
19      else { decrement num_old_sessions; }
20
21  } # end, if s_over
```

Figure 6G

```
1   elseif { no saved state for s_1.SID [or, for all saved state under s_1.SID and any CMID, execution blocked] } {
2       if { transitioning_flag } {
3           if { s_1.CID == old_collection } {
4               s_1.CID = new_collection;
5               decrement num_old_sessions;
6               increment num_new_sessions;
7               if { num_old_sessions == 0 } {
8                   transitioning_flag = false;
9                   num_old_sessions = num_new_sessions;
10                  num_new_sessions = 0;
11                  swap_values(old_collection, new_collection)
12              }
13          }
14      } # end, if transitioning_flag
15  } # end, if not s_over
16  } # end, "when PACKET_RECEIVED"
```

SYSTEM AND METHOD FOR CUSTOMIZING THE IDENTIFICATION OF APPLICATION OR CONTENT TYPE

CROSS REFERENCE TO RELATED APPLICATIONS

This application is related to the following U.S. patent application(s), that are herein incorporated by reference in their entirety:

"System and Method of Updating Modules for Application or Content Identification," filed on the same date even herewith, having inventor(s) Dennis Isao Oshiba, application Ser. No. 13/842,196.

FIELD OF THE INVENTION

The present invention relates generally to the determination of whether a session carries an identifiable type of network traffic, and more particularly to updating modules for performing such identification or to the creation of customized modules for such identification.

BACKGROUND OF THE INVENTION

The importance and complexity of computer networks (such as the Internet) has grown exponentially over the past two decades, and such growth is likely to continue in the foreseeable future. As their size and complexity have increased, various types of traffic controllers, for the management of computer networks, have also found increasing importance.

Traffic controllers are known to be useful for a variety of purposes, including, but not limited to, bandwidth management. As part of performing their function, it is also known to be useful to identify the types of sessions that such traffic controllers are handling. For example, it can be useful to know that a session is being utilized by a particular type of application software (where "application software" can also be referred to herein, more simply, as an application). As another example, it can be useful to know that a session is carrying a particular type of content.

The techniques for identifying a particular type of network traffic can be encapsulated in a subsystem referred to herein as a "module." The set of modules currently available to a traffic controller, for purposes of traffic type identification, can be referred to herein as a "collection." A collection may be organized as a "library" of modules, or according to any other suitable form of organization.

Such collections are known to require updating for a variety of purposes and in a variety of ways. For example, an algorithm, by which a module identifies whether a session is being used by a particular type of network traffic, may be improved. In this case, an update of the module may be needed. As another example, a type of network traffic, not previously identified, can have an algorithm for its identification developed. This algorithm can be added, as an entirely new module, to a collection. Conversely, a type of network traffic, that is being identified by a module, may become obsolete. Thus, the module, for identification of this type of traffic, may need to be removed from a collection.

It would be desirable to improve the process by which a pre-existing (or "old") collection of modules is replaced with an updated (or "new") collection.

Traffic controllers are typically mass-produced, to serve the needs of a large group of customers. As such, traffic controllers are often sold with module collections that only identify types of network traffic that occur very frequently, across many types of customers.

It would be desirable to improve the ability of a single customer, or a relatively small group of customers, to have prepared modules that identify less-frequent types of traffic. For example, a customer may be the only organization to use its particular in-house software.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 1A depicts several clients (Client 110, Client 111, . . . Client 112) that exchange packets with a sever (e.g., Data Center 130).

FIG. 1B shows three important event types, that can trigger a classification module.

FIG. 2C shows an example internal structure for a CM collection such as 201.

FIG. 3C depicts an example internal realization of State Tables 240.

FIGS. 5A-5C depict, in pseudo-code form, an example control procedure by which a Control Engine 200 can implement certain constructs.

FIG. 6A presents, as part of depicting a pseudo-coded process, a number of globally persistent variables that are to be allocated and initialized.

FIG. 6B depicts a COLLECTION_LOADED procedure, that is activated each time an updated CM collection is loaded.

FIGS. 6C-6G depict a collection-switching version of the PACKET_RECEIVED procedure, that is a modified form of the procedure shown in FIGS. 5A-5B.

DETAILED DESCRIPTION OF PREFERRED EMBODIMENTS

Figure 2A:
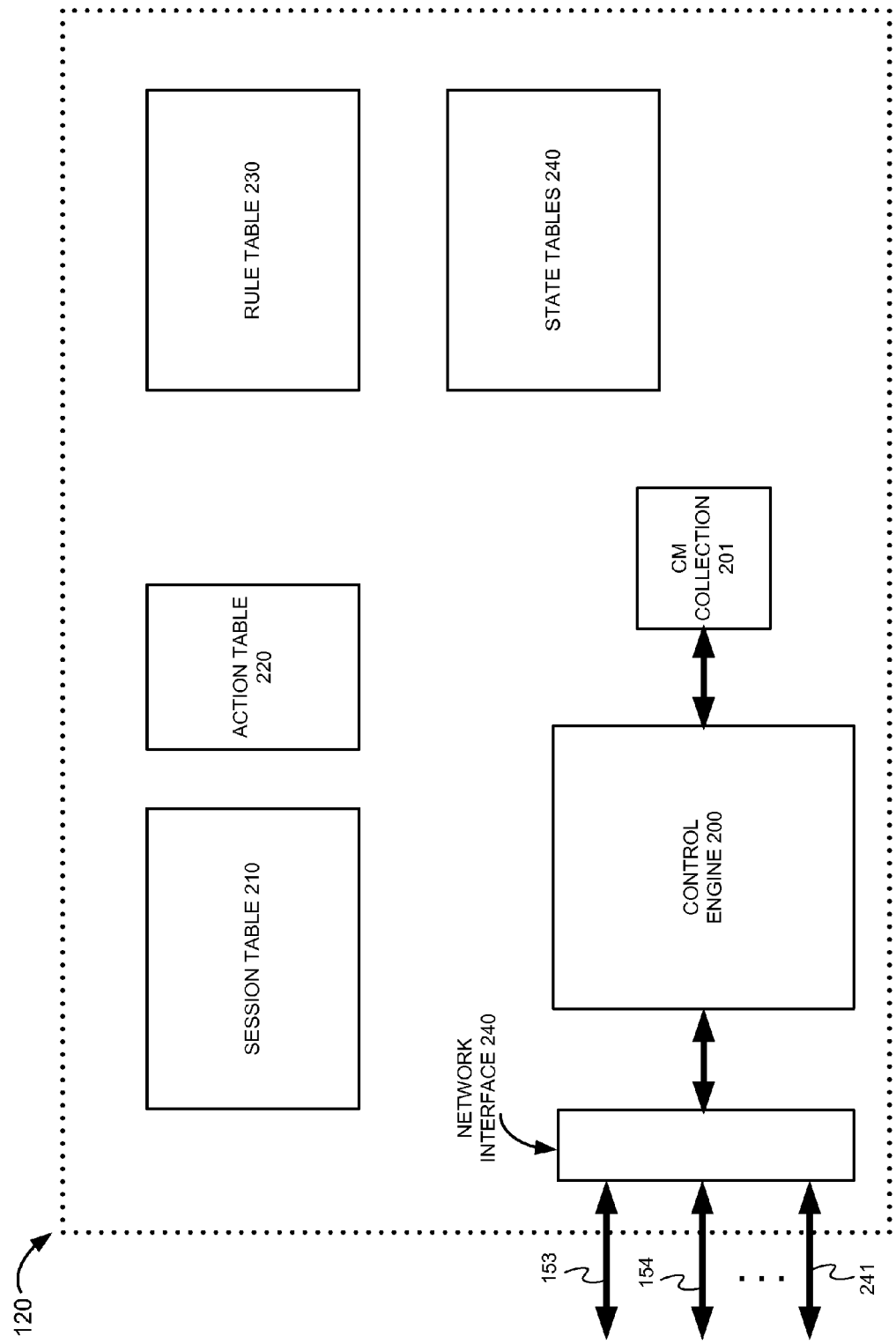
FIG. 2A shows an example interior structure for a traffic controller (such as Traffic Controller 120).

Reference will now be made in detail to various embodiments of the invention, examples of which are illustrated in the accompanying drawings. Wherever possible, the same reference numbers will be used throughout the drawings to refer to the same or like parts.

Please refer to Section 5 below ("Glossary of Selected Terms") for the definition of selected terms used below.

Table of Contents to Detailed Description

| | |
|---|---|
| 1 | Introduction |
| 2 | Classification Module Language |
| 3 | Multiple Collections |

| | Table of Contents to Detailed Description |
|---|---|
| 4 | Additional Information |
| 4.1 | Computing Equipment |
| 5 | Glossary of Selected Terms |

1 Introduction

The term "session," as utilized herein, is understood very broadly (see definition in below Glossary of Selected Terms).

With respect to the network traffic that is carried by a session, the determination of its type can be referred to herein as "classification." The expertise for performing a classification can be encapsulated in a module. The term "module" as utilized herein is (as with a session) also understood very broadly (see definition in below Glossary of Selected Terms).

A module for performing classification can be referred to herein as a "classification module" or CM. The inventive techniques presented herein focus on two main areas:
- Improving the process by which a CM collection, as utilized by a traffic controller, is updated.
- Enhancing the ability of a user, or small groups of users, to create classification modules customized to the particular types of network traffic they handle (please see Glossary for definition of "user").

With respect to the latter, of the two above-listed areas, certain programming language constructs are herein introduced. Incorporation into a programming language, of one or more of these constructs, is defined to result in a programming language referred to herein as a "Classification Module Language" or CML. A CML facilitates the writing of a CM customized to identify network traffic that is peculiar to a particular user, or to a relatively small group of users. For example, a company may have one or more in-house applications that are unique to that company.

The example CML presented herein is called CML_Tcl. (For a correspondence, between CML_Tcl and products of A10 NETWORKS, see the below Glossary of Selected Terms.) CML_Tcl is based upon the "Tcl" programming language (please see Glossary for further identification of Tcl). Also, the pseudo-code presented herein, used to illustrate example implementations of some CML constructs, is itself loosely based upon CML_Tcl and uses some CML constructs. In particular, a key construct of a CML is that it is event driven. The syntax presented herein, for having code event driven, is the same for both CML_Tcl and the pseudo-code. A "when" command is used, that has the following structure:

```
when EVENT_NAME {
  <code to execute upon event>
}
```

The above "when" statement is triggered by an event generically referred to as EVENT_NAME (the convention is followed herein of naming an event in all capitals). The entire body of the "when" can also be referred to herein as the "EVENT_NAME procedure."

An example network environment, for a traffic controller (Traffic Controller 120), is shown in FIG. 1A. FIG. 1A depicts several clients (Client 110, Client 111, . . . Client 112) that exchange packets with a server (e.g., Data Center 130). Data Center 130 can comprise, for example, the following (not shown) equipment: an array of largely homogeneous servers (e.g., a server "farm"), all of which receive work requests through a common server load balancer. For clients outside the Data Center, the server load balancer can provide a consolidated IP address (a.k.a. a Virtual IP or VIP). Clients send their requests to the VIP and responses, from Data Center 130, appear to have the VIP as their source IP address. Data Center 130 is shown as being administered by a private entity (e.g., a "Company") and connects to a private network 101 by a link 155. Traffic Controller 120 couples private network 101 to the Internet (shown as Internet 100). Traffic Controller 120 connects to the private network by a link 154, and to the Internet by a link 153. The Traffic Controller 120 can be utilized for any suitable purpose, including, but not limited to, bandwidth management. Each of the clients connects to the Internet by a corresponding link (e.g., each of clients Client 110, Client 111, . . . Client 112 has, corresponding to it, Link 150, Link 151, . . . Link 152).

An example interior structure for a traffic controller (such as Traffic Controller 120) is shown in FIG. 2A. Traffic Controller 120 is shown as including a Control Engine 200. By controlling a Network Interface 240, Control Engine 200 can control the transmission and receipt of packets, between clients and servers. For purposes of determining the type of traffic conducted by a session, Control Engine 200 is shown as having loaded a collection of classification modules called CM Collection 201. The term "loaded," as utilized herein, is understood very broadly (see definition in below Glossary of Selected Terms). Control Engine 200 is shown as controlling links 153, 154, as well as any other number of links, represented by the ellipses and link 241.

When not classifying sessions, the operation of Traffic Controller 120 can be understood by reference to its Session Table 210 and Action Table 220. Example interior structures, for Session Table 210 and Action Table 220, are shown in FIG. 3A.

Figure 3A:
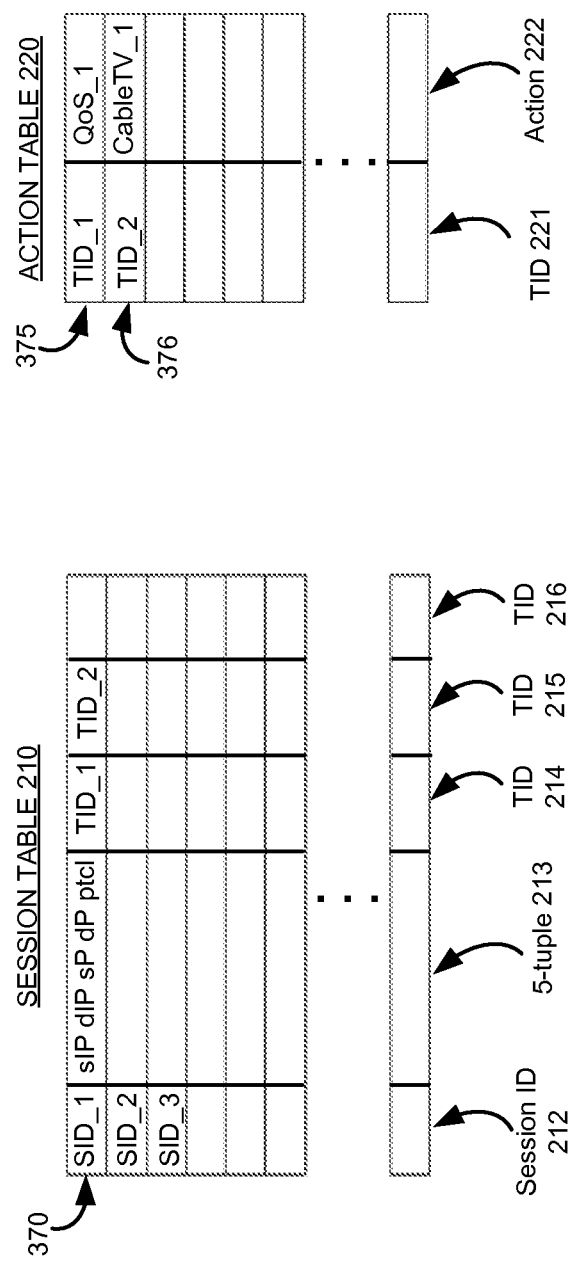
FIG. 3A illustrates example interior structures, for Session Table 210 and Action Table 220.

A session can often be distinguished, from other sessions, by its values for the following 5-tuple:
- source IP
- source Port
- destination IP
- destination Port.
- protocol-used, and (if applicable) its current state However identified, each session is typically represented by its own instance of a data structure, referred to herein as a "Session Record." FIG. 3A shows each Session Record represented by an entry in a Session Table 210. Each Session Record is shown as comprising the following fields:
- Session ID (or SID) 212: a unique identifier (such as a unique number) that distinguishes each entry, of the Session Table, from all its other entries.
- 5-tuple 213: the 5-tuple discussed above, relating to the unique identification of each session.
- Traffic ID's (or TID's) 214, 215, 216: Depending upon how the traffic of a session is classified (a process to be discussed further in the following section), one or more TID's may be added. While only three such TID's are shown, any suitable number can be allocated to each Session Record.

As an example, row 370 of Session Table 210 depicts a Session Record with the following values:
- SID="SID_1"
- 5-tuple=sIP dIP sP dP ptcl
- TID's="TID_1," "TID_2."

The TID's assigned to a session can be used, as follows, to effect a traffic controller's handling of the packets it receives:

Each time a packet p_1 is received, its session s_1 is determined.

The Session Record, for the identified session, is accessed.

If necessary, the 5-tuple for s_1 is updated. Typically, this involves updating the state of the protocol.

The TID's, for the identified Session Record, are accessed and applied to an Action Table, such as Action Table 220 of FIG. 3A.

Each action retrieved is applied to the processing of the current packet. The processing of a packet, in accordance with a particular course of action, can also be referred to as a "policy." Even if specific TID's have not yet been assigned to the Session Record of a session, as a result of classification modules, its packets can still be processed according to a default policy (or policies).

For example, suppose the operator of a traffic controller is a company called "CableTV Inc.," that provides cable television service. Assume CableTV Inc. has its own in-house application software called "CableTV_1." Further suppose that the company has at least the two following goals regarding its software:

1. It wishes to give usage of its software top priority over its networks.
2. It wishes to monitor usage of the software.

Action Table 220 shows two example entries, 375 and 376, that have been configured by CableTV Inc. (These entries can be configured by CableTV Inc. using any suitable interface, as provided by the producer of traffic controller 120. Suitable interfaces can include, but are not limited to, a Graphical User Interface or Command Line Interface.) In accordance with action 375, each packet identified as type TID_1 is handled with a quality of service level called "QoS_1" (which we will assume, for CableTV Inc., represents its highest priority network usage). In accordance with action 376, each packet identified as type TID_2 is identified as "CableTV_1" (which we will assume, for CableTV Inc., means the packet will be reported as being associated with application CableTV_1).

Thus, if sessions with CableTV Inc.'s data center that utilize CableTV_1 can be classified with TID's TID_1 and TID_2, the company's goals, for usage of this particular item of in-house software, can be realized.

Figure 3B:
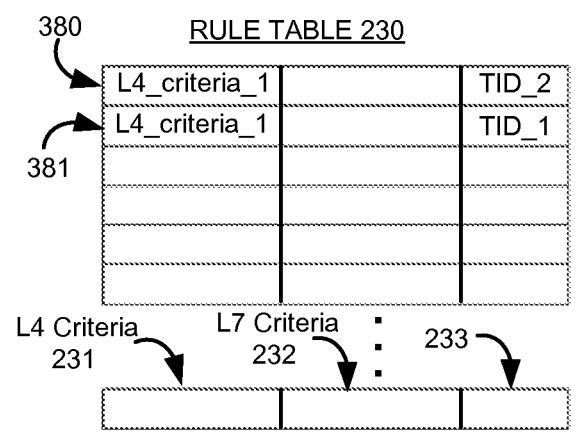
FIG. 3B shows an example internal realization of Rule Table 230.

The specification, for how sessions are to be classified, can be organized as a collection of classification rules. In general, a classification rule is comprised of the following two main sections:

trigger conditions, and
an identification to added to a session if the trigger conditions are met Each rule can be represented as an instance of a data structure, referred to herein as a "Rule Record." Each Rule Record can be stored as an entry in a Rule Table, such as Rule Table 230 of FIG. 2A. An example internal realization of Rule Table 230 is shown in FIG. 3B. The trigger conditions are specified by the following two fields:

L4 Criteria 231: Although referred to as "L4 Criteria," this is just a shorthand, and it should be understood that this field can contain any combination of criteria at L4 or lower. It is often possible to classify a session based upon an examination of data from its first packet, where such data has been drawn from fields of the packet that operate at L4 or lower.

L7 Criteria 232: Although referred to as "L7 Criteria," this is just a shorthand, and it should be understood that this field can require any combination of criteria from among the levels L7 or lower. If above L4 information is needed to identify a session, or if state must be kept across multiple packets, it is appropriate to use this field rather than 231. Field 232 of a Rule Record can specify such criteria by containing a "classification module ID" or CMID (explained further below).

The identification to be added, if the rule's trigger conditions are satisfied, is specified by TID field 233.

For the time being, we will assume that the goals of CableTV Inc. can be met with rules that only use criteria of L4. FIG. 3B shows two example classification rules, 380 and 381, both of which rely upon criteria of L4 or lower. For simplicity of exposition, the particular criteria of each of rules 380 and 381 is represented symbolically. The criteria of rules 380 and 381 are the same, and are represented by "L4_criteria_1." Anyone of ordinary skill in this area will readily appreciate that L4_criteria_1 can represent value (and/or value range) specifications for such packet characteristics as:

source IP address
destination IP address
source Port
destination Port
MAC address
(and any further appropriate criteria)

Example session 370, of Session Table 210 of FIG. 3A, is assumed to have met the criteria of rules 380 and 381. As a result of the prior triggering of classification rules, this session, identified by SID SID_1, is shown as already having been assigned TID's TID_1 and TID_2.

The specification of classification rules by a user, such as the specification of rules 380 and 381, can be accomplished using any suitable interface, as provided by the producer of traffic controller 120. As already introduced above, suitable interfaces can include, but are not limited to, a Graphical User Interface (or GUI) or Command Line Interface (or CLI).

2 Classification Module Language

The example presented in the previous section, of CableTV Inc. taking certain actions with regard to packets generated by use of its in-house software CableTV_1, assumes that a session (i.e., the session with SID "SID_1") was able to be classified with criteria≤L4. If that is not the case, and criteria above L4 are needed, under conventional scenarios, CableTV Inc. may not have attractive options.

As has been discussed above, traffic controllers are typically mass-produced, to serve the needs of a large group of customers. As such, traffic controllers are often sold with classification module collections (or CM collections) only designed to identify traffic types occurring very frequently, across many types of customers. Thus, it is unlikely the traffic-controller provider has a classification module designed specifically for CableTV Inc.'s in-house software.

Conventional options for CableTV Inc. typically include the following:

Hiring the provider of the traffic controller to perform full-custom programming, resulting in a classification module that is added to CM collection 201. This approach requires minimum technical expertise from the user but (especially for specialized software with a limited end user base) can be cost prohibitive.

The user performs full-custom programming, and produces a classification module. This approach minimizes monetary cost to the user, but requires a very high level of technical skill.

This section presents certain programming language constructs that make it easier for a traffic controller user, such as CableTV Inc., to write its own classification module. As discussed above, a programming language with one or more of these constructs is referred to herein as a Classification Module Language or CML. As such, a CML provides a kind of midpoint, between the levels of technical skill required by the two above-described conventional options.

Continuing with the example of CableTV Inc., we will assume they have at least two different types of users of its data center and networks:
  administrative users; and
  end users.

Relative to the end-users, the administrative users can be expected to be much more technologically knowledgeable. Administrative users typically have responsibilities that include the following:
  Design and maintenance of CableTV Inc.'s data center.
  Design and maintenance of CableTV Inc.'s network, that can include such equipment as a traffic controller.

In contrast, end-users can often include persons with little or no technical background. Such end-users use software (through clients such as 110, 111, . . . 112), such as CableTV_1, as a kind of service, expecting the service to be available whenever needed. (Depending upon the user and/or situation, an administrative user and end-user can be the same person.)

In general, a CML is intended for use by administrative users.

FIGS. 5A-5C depict, in pseudo-code form, an example control procedure by which a Control Engine 200 can implement certain constructs, that have been added to the Tcl programming language, and that result in what has been called above a CML_Tcl. As was discussed above, a key construct of a CML is that it is event driven, and an example syntax for this construct (also introduced above) is the "when" command.

As was also discussed above, the pseudo-code presented herein is itself loosely based on CML_Tcl. For example, it can be seen that the entire control procedure of FIGS. 5A-5C is wrapped within a pseudo "when" statement:
  A "when" begins at line 1, FIG. 5A, triggering from an event called "PACKET_RECEIVED," and ends with the right bracket of line 5, FIG. 5C.
  A PACKET_RECEIVED event is defined as follows: it occurs whenever a traffic controller receives a packet, of a type within its scope of control, regardless of the packet's direction or purpose.
  The just-received packet, that constitutes the latest PACKET_RECEIVED event, is referenced in the body of the "when" by the variable p_1.
  In accordance with the convention discussed above, the entire "when" statement is also be referred to herein as the "PACKET_RECEIVED procedure."

The first action the PACKET_RECEIVED procedure performs is referred to herein as "session-detection." (In the pseudo-code, session-detection is performed by the call to procedure session_detection, line 10, FIG. 5A.) Session-detection is defined herein as follows: determining, when a packet p_1 is received, whether p_1 is either:
  the start of a new session (in the case of FIG. 5A, line 10, indicated by the setting of the variable new_session to true); or
  a continuation of a pre-existing session (in the case of FIG. 5A, indicated by the setting of the variable new_session to false).

Regardless of whether p_1 is the start or continuation of a session, session_detection causes s_1 to refer to such session. It is also useful to determine whether the just-received packet is the final packet of a session. In the case of session_detection, this is indicated by the setting of the variable s_over to true (line 10).

The beginning of a new session can be identified in any suitable way. In some cases, it can be identified by extracting the following 5-tuple from p_1:
  source IP
  source Port
  destination IP
  destination Port.
  protocol-used, and (if applicable) its current state The extracted 5-tuple can then be compared to each Session Record of Session Table 210. If no match is found, to a pre-existing Session Record, a new Session Record is created and added to the Session Table.

Before p_1 is processed according to the Traffic ID's of its Session Record, p_1 itself is first subjected to classification, since it could effect the Traffic ID's. At least some of the classification modules of CM collection 201 are assumed to be written in a CML, such as CML_Tcl.

In addition to being event driven, another key aspect of a CML are the types of events by which it can be triggered. Three important event types, that can trigger a classification module, are shown in FIG. 1B. The types are:
  CLIENT_DATA: a "CLIENT_DATA" event occurs when a packet, on its way from a client to a server, is intercepted by a traffic controller. FIG. 1B shows an example CLIENT_DATA event 140.
  SERVER_DATA: a "SERVER_DATA" event occurs when a packet, on its way from a server to a client, is intercepted by a traffic controller. FIG. 1B shows an example SERVER_DATA event 141.
  RULE_INIT event: a "RULE_INIT" event occurs when the first packet of a session is intercepted by a traffic controller, regardless of whether it is a CLIENT_DATA or SERVER_DATA event.

Another key aspect of a CML is that it be capable of keeping state information, at least between the events of a single session. This is because identification of the type of traffic carried by the session can require the examination of multiple packets. A primary function of the RULE_INIT event is to initialize such state. At least three different types of state can be defined:
  intra-session persistent state: The CML only guarantees the persistence of the state within the existence of a single session.
  intra-module persistent state: The CML guarantees persistence of state between sessions, so long as the sessions use the same classification module (as indicated by common CMID).
  globally persistent state: The CML guarantees persistence of state between all sessions.

Focused-upon herein is intra-session persistent state, since that is the type of state most commonly used. An example syntax for declaring, respectively, each of the three above-listed types of states is presented in the below example "when" statement (the below also referred to herein as Example_2):

```
when RULE_INIT {
    set intra_session_state 0
    set ::intra_module_state 0
    set ::global::global_state 0
}
```

Above Example_2 initializes each variable using the Tcl "set" statement. The syntax of each of the above-initialized variables is explained, respectively, as follows:

An intra-session persistent variable "intra_session_state" is created, by simply introducing the variable's name.

An intra-module persistent variable "intra_module_state" is created, by prefixing the variable's name with a pair of colon symbols (i.e., ::).

A globally persistent variable "global_state" is created, by prefixing the variable's name with two pairs of colon symbols surrounding the keyword "global" (i.e., ::global::).

FIG. 2C shows an example internal structure for a CM collection such as 201. Shown are three classification modules: 280, 281, and 282. Each module is written in CML_Tcl. Although only three modules are shown, any suitable number of classification modules can be included in a collection.

Each module begins with a statement, called Module_Name, used to assign it a unique ID. This unique ID is also referred to herein as a "classification module ID" or "CMID." Modules 280, 281, and 282 are each given, respectively, the following CMID's: CM_ID_1, CM_ID_2, and CM_ID_3. Module 280 consists of three "when" statements, each triggered, in order from top to bottom, by the following event: RULE_INIT, CLIENT_DATA, and SERVER_DATA. The body of code, within each "when" statement, is not shown. Module 281 consists of two "when" statements: RULE_INIT and CLIENT_DATA (once again, the body of code within each "when" statement is not shown). Module 282 does not need persistent state, in order to accomplish its form of classification, and so a "when" statement triggered by RULE_INIT is not needed. Module 282 happens to include two "when" statements both triggered by the SERVER_DATA event.

Figure 4A:
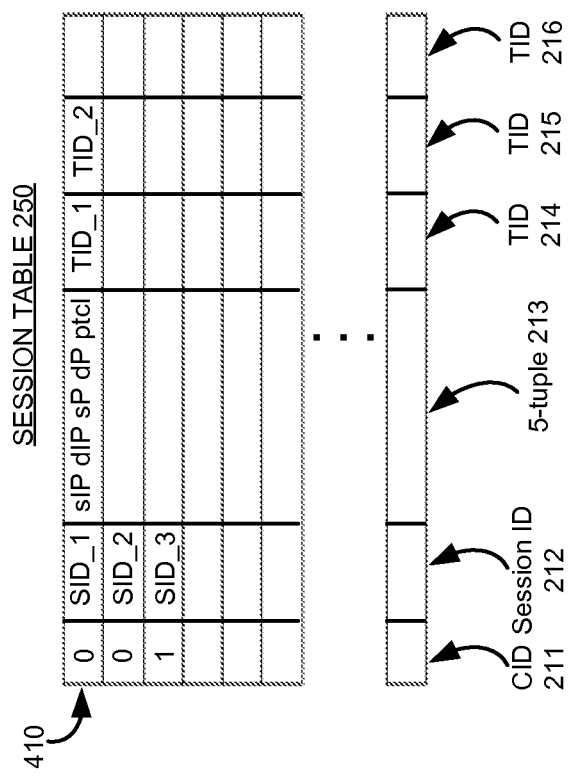
FIG. 4A illustrates internal realization of Session Table 250.
Figure 4B:
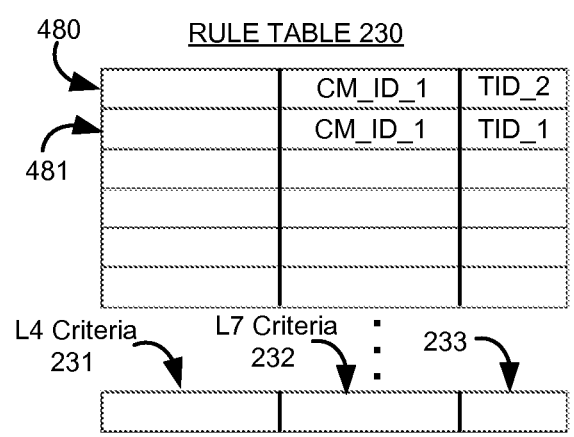
FIG. 4B is the same as FIG. 3B, except the use of L4 Criteria field 231 is replaced with referencing CM_ID_1 in L7 Criteria field 232.

If, for example, module 280 were written by CableTV Inc. in CML_Tcl, in order to identify packets of its software CableTV_1, then suitable classification rules for achieving CableTV Inc.'s goals are shown in FIG. 4B. Rules 480 and 481 of FIG. 4B are the same as rules 380 and 381 of FIG. 3B, except the use of L4 Criteria field 231 is replaced with referencing CM_ID_1 in L7 Criteria field 232.

Interpretation of a RULE_INIT event, when included as part of a classification module, is accomplished by lines 12-29 of FIG. 5A. If the latest-to-be-received packet p_1 is the first packet of a new session (tested by line 12), then any initialization that might be required (by a classification module operating within the context of the new session) can be performed.

Each classification module is iterated over (line 13). For the current CM (called cm_1 in the pseudo-code), it is tested (line 14) for whether it contains functionality triggered by a RULE_INIT type event. For example, if the classification module is written in CML_Tcl, such functionality can be specified by a "when" statement that identifies RULE_INIT as its triggering event. If RULE_INIT functionality is present in cm_1, each of the three above-listed types of state can be processed. The result of processing declarations of state can be represented by state tables, such as State Tables 240 of FIG. 2A. FIG. 3C depicts an example internal realization of Tables 240, with each of the three above-described types of state represented by a corresponding table:

Intra-Session Table 300: Each declaration of intra-session persistent state can be represented by a row of this table. Each row can also be referred to herein as an Intra-Session State Record. To access an item of intra-session state (where the state itself is represented by field 304 of Table 300), the following three fields must match:
SID 301
CMID 302
Variable Identifier (or VID) 303

Intra-Module Table 310: Each declaration of intra-module persistent state can be represented by a row of this table. Each row can also be referred to herein as an Intra-Module State Record. To access an item of intra-module state (where the state itself is represented by field 314 of Table 310), the following two fields must match:
CMID 312
Variable Identifier (VID) 313

Global Table 320: Each declaration of globally persistent state can be represented by a row of this table. Each row can also be referred to herein as a Global State Record. To access an item of global state (where the state itself is represented by field 324 of Table 320), only the following field need match:
Variable Identifier (VID) 323

Each state table has records added by one of the three following "for" loops of FIG. 5A:
lines 15-18: produces records for Intra-Session Table 300
lines 19-22: produces records for Intra-Module Table 310
lines 23-26: produces records for Global Table 320

Regardless of whether the latest packet p_1 represents a RULE_INIT type event, it needs to be tested for whether it is an event of type CLIENT_DATA or SERVER_DATA. Testing, for these event types, is called event-detection. For the PACKET_RECEIVED procedure, event-detection is performed by a call to event_detection (FIG. 5B, line 6).

By the time event_detection is executed, the following is known:
1. latest-received packet p_1 has been associated with a session s_1; and
2. any state needed by a classification module, to classify p_1 within the context of session s_1, has been initialized.

The pseudo-code of FIG. 5B, lines 9-28, presents an example process by which CLIENT_DATA and SERVER_DATA type events can be interpreted.

Each classification rule (such as a row of Rule Table 230 as shown in either of FIG. 3B or 4B) is iterated over (by the "for" loop of line 9, FIG. 5B). For current rule r_1, it is tested for whether it uses a classification module (line 10). (For example, rule 381 of FIG. 3B does not use a CM while rule 481 of FIG. 4B does.) If r_1 does use a CM, cm_1 represents the module. Any pre-existing intra-session persistent state, under which cm_1 should be executed, is fetched (line 11). Tests are then made, by each of lines 12-13 and 17-18 to determine, respectively, whether p_1 has caused a CLIENT_DATA or SERVER_DATA event.

Depending on which of these tests is satisfied, the appropriate portion of cm_1 is executed:
any CLIENT_DATA "when" statements are executed (line 15) if a CLIENT_DATA event has occurred; or
any SERVER_DATA "when" statements are executed (line 20) if a SERVER_DATA event has occurred.

During the execution of either type of "when" statement, variables can be accessed that require intra-module persistent state or globally persistent state (the possibility is mentioned in the comments of lines 14 and 19). As discussed above, for each such variable, with a VID $v\_1$, intra-module persistent state can be accessed with $cm\_1$. CMID and $v\_1$ (applied to, for example, an Intra-Module Table 310) or globally persistent state can be accessed with $v\_1$ (applied to, for example, Global Table 320).

Even if a triggering event for a $cm\_1$ of an $r\_1$ has occurred, it may be the case that $cm\_1$ has already successfully executed for session $s\_1$. In that case, it can be desirable to block $cm\_1$ from executing again with respect to the same session. This type of blocking, of repeated execution of a classification module with respect to a particular session, can be referred to herein as "Blocking-type Execution." Shown in square brackets, on each of lines 12-13 and 17-18, is the additional test that can be performed as part of adding Blocking-type Execution. These tests check for whether the "state under $s\_1$. SID and $cm\_1$. CMID allows execution."

For either a CLIENT_DATA or SERVER_DATA type event, if the classification module executes successfully (tested by line 22), the following is applicable:

Action portion of the current rule $r\_1$ is performed (line 23). As has been discussed above, the action of a Rule Record is to add a Traffic ID to the applicable session $s\_1$.

If Blocking-type Execution is to be performed, state can be added, to an Intra-Session State Table record, indicating that, for session $s\_1$, $cm\_1$ is not to be executed again. This operation is performed by line 24, shown in square brackets to indicate the optionality of Blocking-type Execution. If an Intra-Session State Record does not already exist for the combination $s\_1$ and $cm\_1$, it can be created by line 24 and then the appropriate indication, to block further execution, can be added.

In terms of the example CML_Tcl, the successful execution of a CM can be specified by programming-in the execution of a particular statement. An example statement that could be executed is the following:

matchCML_Tcl

For the current rule $r\_1$, if a test of it (by line 10) indicates that it does not use a classifier module, then $r\_1$ can be tested for whether it satisfies some other criteria. For example, as shown at line 27 of FIG. 5B, $r\_1$ can rely upon stateless criteria drawn from any combination of L4 to L1 (these criteria having been discussed above, with respect to column 231 of Rule Table 230 of FIG. 3B).

Having made sure that any necessary updates to current session $s\_1$ have been performed, packet $p\_1$ can be processed in accordance with the Traffic ID's of $s\_1$. In the pseudo-code, such packet processing is performed by invoking packet_process at line 30, FIG. 5B.

If $p\_1$ is the last packet of a session (tested by line 1, FIG. 5C), the following can be performed:

Session Record for that session can be removed (or flushed) from the Session Table (line 2).

A flush is performed for any state of the Intra-Session State Table, relating to the combination $s\_1$ and $cm\_1$ (line 3).

At this point, processing of latest-received packet $p\_1$ is complete.

3 Multiple Collections

As discussed above in Section 1 ("Introduction"), the inventive techniques presented herein focus on two main areas:

Improving the process by which a CM collection, as utilized by a traffic controller, is updated.

Enhancing the ability of a user, or small groups of users, to create classification modules customized to the particular types of network traffic they handle (please see Glossary for definition of "user").

Figure 2B:
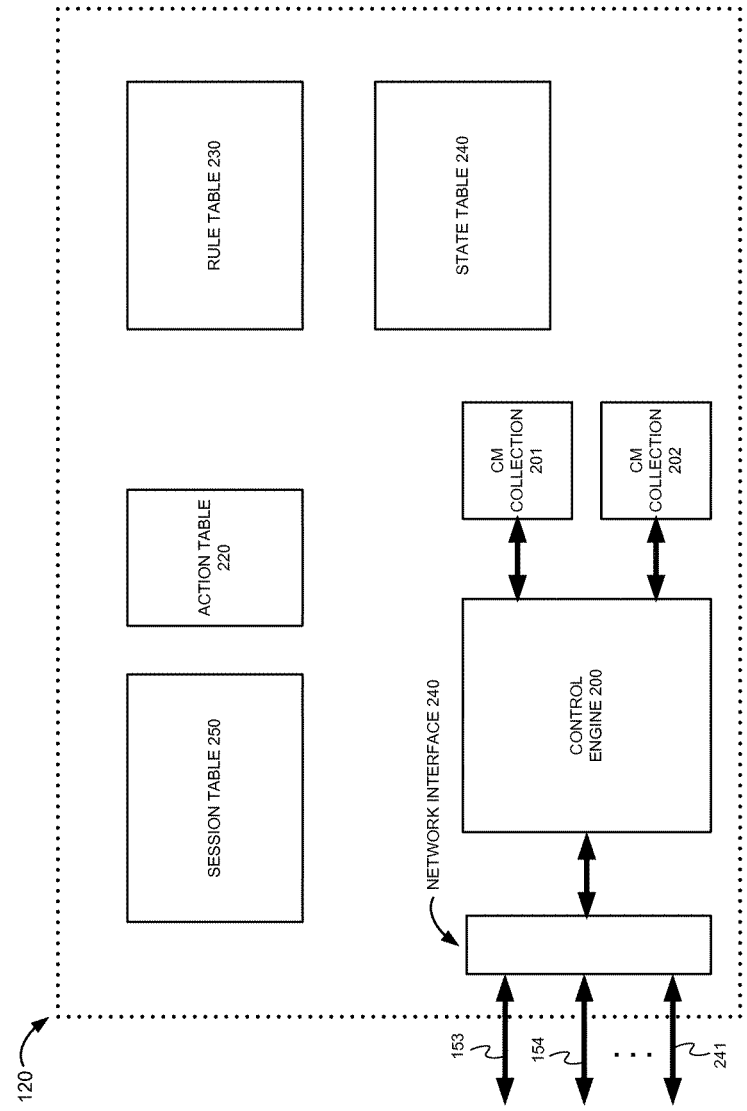
FIG. 2B is the same as FIG. 2A, except for having up to two locations for storing CM collections and having a different Session Table 250.

Having now covered major aspects of the latter of the two above-listed areas, this section focuses on the former. FIG. 2B is the same as FIG. 2A, except for the following:

Rather than being limited to only having one CM collection loaded at any one time, Control Engine 200 is shown as having up to two locations for storing CM collections. The two locations are shown as: CM collection 201, and CM collection 202. For each successive loading of an updated collection, the location to where it is written can alternate back and forth between collections 201 and 202. For example, Control Engine 200 can start with just CM collection 201 loaded. The first time it is necessary to load an updated collection, it can be loaded as CM collection 202. The second time an updated collection is loaded, the location at which to load can alternate back to collection 201. While only two collection-storing locations are shown in FIG. 2B, it can be readily appreciated that any greater number of locations, as shown to be advantageous for a particular situation, can be utilized.

A Session Table 250 is depicted, rather than 210. With regard to the internal realization, the difference between Session Table 250 and Session Table 210 is shown by comparing FIGS. 3A and 4A. As can be seen, FIG. 4A depicts a Session Table 250 with an additional column 211 (called a Collection ID or CID). The CID value, for a particular session $s\_1$, indicates the CM collection to be utilized when classifying $s\_1$ 's packets. For the current example, of only having up to two collections loaded, each CID need only be able to take one of two values, such as 0 or 1.

FIGS. 6A-6G depict a pseudo-coded process similar to that of FIGS. 5A-5B, except it has been modified to accommodate:

loading of an updated (or "new") CM collection, while the pre-existing (or "old") CM collection continues to be used; and once the new CM collection has been loaded, transitioning, on a session-by-session basis that keeps a traffic controller active, from the old CM collection to the new CM collection; and once the transitioning is completed, preparing for the possibility (at some later time) of loading yet another updated CM collection.

FIGS. 6A-6G are organized as follows:

FIGS. 6C-6G depict a collection-switching version of the PACKET_RECEIVED procedure, that is a modified form of the procedure shown in FIGS. 5A-5C.

FIG. 6B depicts a COLLECTION_LOADED procedure, that is activated each time an updated CM collection is loaded.

FIG. 6A presents a number of globally persistent variables that are to be allocated and initialized, prior to beginning operation of either the PACKET_RECEIVED or COLLECTION_LOADED procedures.

FIGS. 6A-6G are explained in conjunction with an example, that is also referred to herein as Example_1. Example_1 begins with Traffic Controller 120 having loaded only a single CM collection 201, and with the initializations of FIG. 6A having been performed. The initializations of FIG. 6A are as follows:

transitioning_flag (line 7): For the example presented herein, initially set to "false," since only one CM collection has been loaded. Set to "true" from just after a replacement collection of classification modules has been loaded, and remains true until transition to the replacement collection has been completed.

num_old_sessions (line 13): initialized to zero. When not transitioning between classification module collections, used to keep track of the number of sessions in session table. As soon as a new CM collection is loaded, this count can only decrement and, when it reaches zero, the transitioning is complete.

num_new_sessions (line 18): initialized to zero. Only used while transitioning between classification module collections. Used to track: number of new sessions created since loading of new CM collection, and number of pre-existing sessions modified to refer to the new CM collection.

old_collection (line 22): When not transitioning between classification module collections, used for setting the CID value of new sessions. While transitioning, indicates the old CID value.

new_collection (line 23): Only used while transitioning between classification module collections. Used for setting the CID value of new sessions and for resetting the CID value of pre-existing sessions.

Continuing with Example_1, until an updated CM collection is loaded, the PACKET_RECEIVED procedure of FIGS. 6C-6G operates as follows (a process similar to the PACKET_RECEIVED procedure of FIGS. 5A-5C):

Packets are received by the traffic controller (corresponds to a triggering of the PACKET_RECEIVED event).

For each new session detected, a Session Record is added to Session Table 250 (by call to session_detection).

A globally persistent count is kept (by num_old_sessions) of the number of Session Records.

Each Session Record is given a CID value of 0. For example, Session Record 410 of FIG. 4A is the same as Session Record 370 of FIG. 3A, except it includes a Collection ID field with a current value of 0.

At some point in time, an updated CM collection is loaded, and is referred to herein as CM collection 202. Each time an updated CM collection is loaded, the COLLECTION_LOADED procedure of FIG. 6B is executed. It sets the globally persistent flag, transitioning_flag to "true" (line 4). This indicates that a transition is to be pursued, between the old CM collection (i.e., CM collection 201) and the updated (or "new") CM collection (i.e., CM collection 202). Since no sessions have yet been created under, or transferred to, the new CM collection, num_new_sessions has been properly initialized (by line 18, FIG. 6A) to 0.

As each packet p_1 is received by the traffic controller, for so long as the transitioning_flag remains true, any one of the following actions can be done:

Any new sessions detected are given a Session Record with a CID value of 1. This ensures that any further packets received, if part of a new session, are classified by modules from the new CM collection. A count is kept (by num_new_sessions) of these new Session Records.

For a session s_1 that existed before loading of the new CM collection:
  If the receipt of its latest packet p_1 represents an opportunity, when the session can be transitioned to the new CM collection, the following is done:
    s_1's CID value is changed to 1
    num_old_sessions is decremented, and
    num_new_sessions is incremented.
  If the receipt of its latest packet p_1 represents the end of s_1, the following is done:
    session is flushed from the Session Table
    any intra-session state of s_1 is also flushed, and
    num_old_sessions is decremented.
  Each time num_old_sessions is decremented, as part of one of the two above-listed items, it is also tested for being 0. If it is, it is known that the transition from the old CM collection to the new CM collection has been completed. Preparation, for a possible future loading of another updated CM collection, is accomplished as follows:
    transitioning_flag is set to false
    num_old_sessions is set to the value of num_new_sessions, and
    num_new_sessions is set to 0

Having presented an overview of the process, the pseudo-code of FIGS. 6C-6G is explained in more detail as follows.

First, session-detection is performed at line 10, FIG. 6C. This corresponds to line 10 of FIG. 5A. Next, if a new session is detected (FIG. 6C, line 12), it is handled by the code of FIG. 6C, line 13 to FIG. 6D, line 13. The code for handling new sessions corresponds to lines 13-29, of FIG. 5A. The differences are due to the need to handle the transitioning state. The transitioning_flag is tested (line 13) for whether it is set to "true":

If it is set to "true," the traffic controller is transitioning between CM collections and the following actions are taken:
  The CID of the new session is set to point to the new CM collection by using the value of new_collection (line 14).
  To keep track of the sessions that are being classified by the new CM collection, num_new_sessions is incremented (line 15).
  Each classifier module to be tested, for whether it has a portion triggered by the RULE_INIT event, is selected (see "for" loop of line 16) from the new CM collection.

Otherwise (see "else" of FIG. 6D, line 1):
  The CID of the new session is set to point to the old CM collection by using the value of old_collection (FIG. 6D, line 2).
  To keep track of the sessions that are being classified by the old CM collection, num_old_sessions is incremented (line 3).
  Each classifier module to be tested, for whether it has a portion triggered by the RULE_INIT event, is selected (see "for" loop of line 4) from the old CM collection.

Regardless of whether the latest packet p_1 represents the start of a new session, events of type CLIENT_DATA or SERVER_DATA are tested-for next (see call to event_detection, line 21, FIG. 6D). This is the same type of event-detection discussed in the previous section with respect to line 6 of FIG. 5B.

The Rule Records (such as those of FIG. 4B) are executed next. The pseudo-code for iterating over such rules (see FIG. 6E, lines 2-27) is the similar to that discussed in the previous section (and shown at FIG. 5B, lines 9-28). The difference is the addition of lines 4-8 of FIG. 6E, that test whether transitioning between CM collections is in effect. If the traffic controller is in process of switching CM collections (tested for by line 4), but the current session is still using the old CM collection (tested for by line 5), then the cm_1 for r_1 is drawn from the old CM collection (as indicated by lines 5-6). Otherwise, the cm_1 for r_1 is drawn from the new CM collection (by line 7). If the traffic controller is not in process of switching CM collections, the cm_1 for r_1 is drawn from the old CM collection (by line 9).

Packet processing is performed next, and the pseudo-code for that (see FIG. 6E, line 29) is the same as discussed in the previous section (and shown at FIG. 5B, line 30).

The pseudo-code of FIG. 6F corresponds to the pseudo-code of FIG. 5C, lines 1-4. The pseudo-code of FIG. 5C (described in the previous section) simply flushed the session from the Section Table, and the session's intra-session state from the State Table, if the last packet of the session has been reached. The pseudo-code of FIG. 6F does flush the session and its state (at line 2, FIG. 6F), but it also tests (at line 3) for whether transitioning, between CM collections, is still in process. If yes, the following steps are performed:

A test is made for whether this last packet of a session is also the first packet of the same session (line 4):
If yes, then the increment to num_new_sessions, just accomplished above (at FIG. 6C, line 15), needs to be undone (line 5, FIG. 6F).
Else, a test is made (line 8) for whether the session that just ended had already been transitioned to the new CM collection:
If no, then the number of old sessions is decremented (line 9). If this means that all of the old sessions have either transitioned or ended (determined by testing num_old_sessions for zero at line 10):
transitioning is ended (by setting the transitioning flag to "false" at line 11).
assigning the number of "new" sessions to the variable that keeps track of the number of "old" sessions (line 12).
the number of "new" sessions is reset to zero (line 13).
The value used to represent the "old" CM collection (held by old_collection) is swapped (by the "swap_values" function of line 14) with the value used to represent the "new" CM collection (held by new_collection).
Else, the session is a new session that ended before transitioning finished, so only the number of new sessions needs to be decremented (line 16).

If the test of line 3 indicates that transitioning between CM collections is not in process, the ending of a session simply means (other than flushing the session) that the number of old sessions is decremented (line 19).

The pseudo-code of FIG. 6G addresses the case where the packet is not the last of a session, but the session can be modified to utilize the new CM collection. Specifically, a session subject to classification by the old CM collection, can be modified if one of the following is true for s_1 (both of which are tested at line 1, FIG. 6G):
has no saved state; or
(if optional Blocking-type Execution is desired) all saved state indicates that further execution is not allowed.

If transitioning is in effect (tested by line 2), the following steps can be performed:
The session, if it has not already been transitioned to the new CM collection (a condition tested by line 3), can be transitioned.
The transitioning is accomplished by changing the session's CID to that of the new CM collection (line 4), decrementing the number of old sessions (line 5), and incrementing the number of new sessions (line 6).
If the transitioning of s_1 means that all old sessions have either transitioned or ended, as determined by comparing num_old_sessions to zero (FIG. 6G, line 7), transitioning can be ended. This is accomplished by:
setting the transitioning flag to "false" (line 8)
assigning the number of "new" sessions to the variable that keeps track of the number of "old" sessions (line 9).
the number of "new" sessions is reset to zero (line 10).
The value used to represent the "old" CM collection (held by old_collection) is swapped (by the "swap_values" function of line 11) with the value used to represent the "new" CM collection (held by new_collection).

4 Additional Information

4.1 Computing Equipment

With regard to any of the computing systems described herein, such as client computers, a traffic controller, network equipment, and/or a data center, any type of non-volatile media (e.g., a hard drive, solid-state drive, CD-ROM, or DVD) can be included.

Any reference above to information stored in a "table" can also be understood to refer to the use of a database, organized according to any of the techniques known in the art, in accordance with the needs of a particular application.

Computer systems that require interactivity with a user can be equipped with any of the known user interface devices, as is appropriate for the particular application, including, but not limited to: a monitor for visual display (with or without touch screen capability), a keyboard, and a mouse (or any other form of pointing device).

In accordance with what is ordinarily known by those in the art, the computers specified herein contain computational hardware (e.g., integrated circuits), and programmable memories (volatile and/or non-volatile), of various types.

The kind of information described herein (such as data and/or instructions), that is on computer-readable media and/or programmable memories, can be stored on computer-readable code devices embodied therein. A computer-readable code device can represent that portion of a memory in which a defined unit of information (such as a bit) can be stored and/or from which a defined unit of information can be retrieved.

5 Glossary of Selected Terms

A10 NETWORKS: A10 Networks, Inc., a California corporation with a principal place of business in San Jose, Calif., USA.
application:
Any system intended to have a particular area of applicability with respect to at least one group of at least one or more users. Generally has at least some provision for interaction with its user group.
When regarded as primarily software, can be referred to as an "application program" or "application software." In this case, is often defined by distinguishing it against programs involved in executing (e.g., a compiler or interpreter), or in managing the execution of (e.g., an operating system), an application program.
An application can contain one or more modules.
CID: Collection ID. Any value that uniquely identifies each CM collection, in a group of two or more CM collections.
Classification module (or CM): a module that, as a result of its application to a session, can assign a traffic type to one or more of the packets of the session.

CMID: Classification Module ID. Any value that uniquely identifies each classifier module, with respect to a classifier module collection.

CML: Classification Module Language.

CML_Tcl: With regard to the products of A10 NETWORKS, the term "CML_Tcl" can be substituted by the term "AFLEX." The term AFLEX can be capitalized in various ways, including, but in no way limited to, the following: "aFleX," "Aflex," or "aflex."

L1-L7: Refers to a layer of the Open Systems Interconnection (OSI) model, as developed by the International Organization for Standardization (ISO/IEC 7498-1). The OSI model is a way of providing a standardized characterization of the functions of a communications system. Starting at the lowest level layer of L1 (also called the "physical layer"), each successive layer is intended to represent a higher level of abstraction.

Loading or unloading: addresses the ability of a first system to be coupled (or otherwise connected) to a second system. After the "loading" of a first system is complete, it is able to interact with the second system. If a first system is already "loaded," with respect to a second system, after "unloading" of the first system is complete, it is no longer able to interact with the second system.

Module: anything that can be meaningfully regarded, with respect to some larger system, as a distinct subsystem.

Pseudo-code: The pseudo-code presented herein is loosely based on the "Tcl" programming language and CML_Tcl.

Session: as defined herein, refers to the entire process by which any transfer of data, according to some protocol, begins, progresses, and completes. The term session, as used herein, encompasses data transfers under "connectionless" protocols, such as UDP. In the case of UDP, the entire process of data transfer is completed with the transmission of a single packet. For other protocols, such as TCP, a minimum of three packets are needed simply to establish the beginning of a session.

SID: Session ID. Any value that uniquely identifies each session, as managed by a traffic controller.

System:
Can be comprised of hardware, software, or any combination of hardware and software.
Unless indicated otherwise, the term "system" is understood as also referring to anything that can be regarded as a subsystem.

Tcl: a scripting language created by John Ousterhout in 1988. The name was originally an acronym of "Tool Command Language." Since 2000, Tcl has been maintained by the Apache Software Foundation, a not-for-profit corporation.

Traffic control: any technique or techniques by which the transmission of packets within a network is controlled.

Traffic controller: any device that is capable of performing traffic control. With regard to the products of A10 NETWORKS, a traffic controller can include, but is in no way limited to, the following: an Application Bandwidth Manager of the EX Series.

Traffic type: a result of an effort to classify the one or more packets that comprise a session. Such types can typically be grouped into two categories: application or content. Application and content are relative: an application is a way in which to transmit content.

User: refers to the one or more persons that work together, for purposes of using a traffic controller, as a single administrative entity. Thus, a user of a traffic controller can include, but is not limited to, any of the following: an individual person or an individual company. For the case of a "user" that is an individual company, any of its employees or officers, in the course of their utilization of a traffic controller, may be referred to herein as a "user."

VID: Variable ID. Any symbol used to identify a variable in a CML program.

While the invention has been described in conjunction with specific embodiments, it is evident that many alternatives, modifications and variations will be apparent in light of the foregoing description. Accordingly, the invention is intended to embrace all such alternatives, modifications and variations as fall within the spirit and scope of the appended claims and equivalents.

What is claimed is:

1. A computer-implemented method for dynamic network traffic control, comprising:
identifying, by a traffic controller, a first data packet, flowing from a source network device to a destination network device, as a subject of traffic-type classification by the traffic controller, the first packet produced in response to an action by an end-user, the traffic type classification being associated with at least one of an application type and a content type, the traffic controller including a control engine coupled to a network interface, the control engine controlling transmission and receipt of data packets between clients and servers, the control engine including classification modules, each of the classification modules having a unique identifier and being operable to trigger on a RULE INIT event;
identifying by a first collection of traffic classification modules of the traffic controller, a session identifier of the first data packet, the session identifier corresponding to a network session between the source network device and the destination network device, the session identifier distinguishing the network session from other network sessions;
determining that the traffic controller is transitioning from the first collection of traffic classification modules to a second collection of traffic classification modules;
setting the collection identifier for the session to point to the second collection of traffic classification modules;
determining that the first data packet is an event of a first event type, the first event type representing an initiating event;
processing the first data packet in accordance with a rule set defined by the second collection of classification modules and the initiating event; and
producing, as a result of processing the first data packet, an intra-session persistent state for the second collection of traffic classification modules.

2. The method of claim 1, wherein the determining that the first data packet is an event of the first event type further comprises determining that the first packet is an initial packet of its session.

3. The method of claim 1, wherein the first event identifier is represented by an administrative user via a programming language statement of the RULE_INIT event.

4. The method of claim 1, further comprising producing, as a result of processing the first data packet, intra-module persistent for the second collection of traffic classification modules.

5. The method of claim 1, further comprising producing, as a result of processing the first data packet, globally persistent state for the second collection of traffic classification modules.

6. The method of claim 1, further comprising identifying the first packet as being part of a pre-existing first session, in response to receipt of the first packet, if the first packet is not an initial packet to be received, by the traffic controller, with respect to the first session.

7. The method of claim 1, wherein the step of determining that the first data packet is an event of the first event type further comprises determining that the first data packet is traveling from a client to a server.

8. The method of claim 1, wherein the first event identifier is represented by an administrative user via a programming language statement of CLIENT_EVENT.

9. The method of claim 1, further comprising:
classifying the first session as being of a first traffic type; and
configuring the first traffic type, when applied to a session, to cause packets of that session to be processed in accordance with a first policy.

10. The method of claim 9, wherein the first policy guarantees a specific amount of bandwidth for forwarding traffic.

11. The method of claim 9, wherein the first policy specifies a maximum amount of bandwidth for forwarding traffic.

12. The method of claim 9, wherein the first policy marks a priority to be used for forwarded traffic.

13. The method of claim 9, wherein the first policy causes packets not to be forwarded.

14. The method of claim 1, wherein the step of determining that the first data packet is an event of the first event type further comprises determining that the first data packet is traveling from a server to a client.

15. The method of claim 14, wherein the first event identifier is represented by an administrative user via a programming language statement of SERVER_EVENT.

16. The method of claim 1, wherein the second collection of traffic classification modules is written in a classification module language.

17. The method of claim 16, wherein the classification module language is based upon Tcl.

18. The method of claim 16, further comprising compiling, at least in part, a first description into a first object-level specification of the second traffic-classification module.

19. The method of claim 18, wherein the compiling is performed only if the interpreting of the first description indicates that the first description is functionally correct.

20. The method of claim 1, wherein at least one module of the second collection of traffic classification modules is written by an administrative user of a client device using a classification module language.

* * * * *